US010312522B2

(12) United States Patent
Fukumine et al.

(10) Patent No.: US 10,312,522 B2
(45) Date of Patent: Jun. 4, 2019

(54) BINDER COMPOSITION FOR LITHIUM ION SECONDARY BATTERY POSITIVE ELECTRODE, SLURRY COMPOSITION FOR LITHIUM ION SECONDARY BATTERY POSITIVE ELECTRODE, POSITIVE ELECTRODE FOR LITHIUM ION SECONDARY BATTERY AND LITHIUM ION SECONDARY BATTERY

(71) Applicant: ZEON CORPORATION, Chiyoda-ku, Tokyo (JP)

(72) Inventors: Mayumi Fukumine, Tokyo (JP); Takumi Sugimoto, Tokyo (JP)

(73) Assignee: ZEON CORPORATION, Chiyoda-ku, Tokyo (JP)

(*) Notice: Subject to any disclaimer, the term of this patent is extended or adjusted under 35 U.S.C. 154(b) by 0 days.

(21) Appl. No.: 15/558,634

(22) PCT Filed: Mar. 23, 2016

(86) PCT No.: PCT/JP2016/001693
§ 371 (c)(1),
(2) Date: Sep. 15, 2017

(87) PCT Pub. No.: WO2016/157842
PCT Pub. Date: Oct. 6, 2016

(65) Prior Publication Data
US 2018/0090764 A1 Mar. 29, 2018

(30) Foreign Application Priority Data

Mar. 27, 2015 (JP) .................................. 2015-066643

(51) Int. Cl.
H01M 4/13 (2010.01)
H01M 4/62 (2006.01)
C08F 2/38 (2006.01)
C08F 236/04 (2006.01)
H01M 10/052 (2010.01)
H01M 10/0566 (2010.01)
C08F 236/12 (2006.01)
H01M 4/36 (2006.01)
H01M 10/0525 (2010.01)
H01M 4/02 (2006.01)

(52) U.S. Cl.
CPC ............... *H01M 4/622* (2013.01); *C08F 2/38* (2013.01); *C08F 236/04* (2013.01); *C08F 236/12* (2013.01); *H01M 4/364* (2013.01); *H01M 4/62* (2013.01); *H01M 10/052* (2013.01); *H01M 10/0525* (2013.01); *H01M 10/0566* (2013.01); *H01M 2004/028* (2013.01)

(58) Field of Classification Search
CPC ........ H01M 4/622; H01M 4/364; H01M 4/62; H01M 10/052; H01M 10/0525; H01M 10/0566; H01M 2004/028
See application file for complete search history.

(56) References Cited

U.S. PATENT DOCUMENTS

| | | | |
|---|---|---|---|
| 5,807,941 | A | 9/1998 | Tsuji et al. |
| 2005/0244711 | A1 | 11/2005 | Fukui et al. |
| 2013/0330622 | A1 | 12/2013 | Sasaki et al. |
| 2015/0050554 | A1 | 2/2015 | Fukumine et al. |
| 2016/0126553 | A1 | 5/2016 | Murase et al. |

FOREIGN PATENT DOCUMENTS

| | | | |
|---|---|---|---|
| EP | 2716663 | A1 | 4/2014 |
| EP | 3026067 | A1 | 6/2016 |
| EP | 3240069 | A1 | 11/2017 |
| JP | H0963590 | A | 3/1997 |
| JP | 2011134618 | A | 7/2011 |
| JP | 2012204303 | A | 10/2012 |
| JP | 2013008485 | A | 1/2013 |
| JP | 2013206598 | A | 10/2013 |
| WO | 2004004031 | A1 | 1/2004 |
| WO | 2012115096 | A1 | 8/2012 |
| WO | 2012165120 | A1 | 12/2012 |
| WO | 2013080989 | A1 | 6/2013 |
| WO | 2014185072 | A1 | 11/2014 |

OTHER PUBLICATIONS

Oct. 3, 2017, International Preliminary Report on Patentability issued in the International Patent Application No. PCT/JP2016/001693.
Jun. 28, 2016, International Search Report issued in the International Patent Application No. PCT/JP2016/001693.
Oct. 17, 2018, the Extended European Search Report issued by the European Patent Office in the corresponding European Patent Application No. 16771732.1.

*Primary Examiner* — Jane J Rhee
(74) *Attorney, Agent, or Firm* — Kenja IP Law PC

(57) ABSTRACT

Provided is a binder composition for a lithium ion secondary battery positive electrode that can suppress expansion of a positive electrode. The disclosed binder composition for a lithium ion secondary battery positive electrode includes a copolymer containing a nitrile group-containing monomer unit and a conjugated diene monomer unit and a solvent. A degree of swelling in electrolysis solution of the copolymer is at least 200 mass % and no greater than 700 mass % and a storage elastic modulus of a binder coating obtained through film formation of the binder composition is at least $1 \times 10^4$ and no greater than $1 \times 10^9$ Pa.

10 Claims, No Drawings

BINDER COMPOSITION FOR LITHIUM ION SECONDARY BATTERY POSITIVE ELECTRODE, SLURRY COMPOSITION FOR LITHIUM ION SECONDARY BATTERY POSITIVE ELECTRODE, POSITIVE ELECTRODE FOR LITHIUM ION SECONDARY BATTERY AND LITHIUM ION SECONDARY BATTERY

TECHNICAL FIELD

This disclosure relates to a binder composition for a lithium ion secondary battery positive electrode, a slurry composition for a lithium ion secondary battery positive electrode, a positive electrode for a lithium ion secondary battery and a lithium ion secondary battery.

BACKGROUND

Lithium ion secondary batteries have characteristics such as compact size, light weight, high energy-density, and the ability to be repeatedly charged and discharged, and are used in a wide variety of applications.

A lithium ion secondary battery has generally includes electrodes (a positive electrode and a negative electrode) and a separator that separates a positive electrode and a negative electrode to prevent a short circuit between the positive electrode and the negative electrode. Further, an electrode for a lithium ion secondary battery normally includes a current collector and an electrode mixed material layer formed on the current collector. The electrode mixed material layer is formed by using a slurry composition that is obtained by dispersing, for example, an electrode active material, a binder composition including a binding material, or the like, in a dispersion medium.

As a binder composition used for forming an electrode mixed material layer for a lithium ion secondary battery, a binder composition that includes, as a binding material, a mixture of a fluorine-based polymer such as a polyvinylidene fluoride and hydrogenated nitrile rubbers is used (see PTL 1, for example).

In a lithium ion secondary battery, insertion and desorption of lithium ions are performed for each of a positive electrode and a negative electrode while the battery is charged and discharged, and thus expansion and contraction of the electrodes occurs. Expansion and contraction during insertion and desorption of lithium ions are especially large for a negative electrode. Thus, when charging and discharging are repeated to an electrode, in particular to a negative electrode, of a lithium ion secondary battery over a long period of time, the electrode itself expands and the structure of the electrode is destroyed due to an excessive internal stress, which causes a problem of reduction in a battery performance of a lithium ion secondary battery.

To the aforementioned problem, for example, PTL 2 proposes a technique in which a polyimide having specific mechanical properties is used as a binding material for a negative electrode to absorb and ease expansion and contraction of a negative electrode active material so that degradation of battery performance is suppressed.

CITATION LIST

Patent Literature

PTL 1: JPH09-63590 A
PTL 2: WO2004/004031 A1

SUMMARY

Technical Problem

A higher performance has been demanded for a lithium ion secondary battery, and in recent years, due to an increased density of a positive electrode for a lithium ion secondary battery, a further improved performance has been demanded for a lithium ion secondary battery. However, since expansion and contraction of a positive electrode during insertion and desorption of lithium ions is not as large as those of a negative electrode, and thus nothing has been examined as to a technique to suppress expansion of a positive electrode itself. Thus, expansion of a positive electrode cannot be suppressed sufficiently with a second battery including a positive electrode formed by using a binder composition that includes the aforementioned conventional binding material to which nothing has been examined as to expansion of a positive electrode, and as a result of this, a battery performance has not been improved sufficiently.

It is therefore an object of this disclosure to provide a binder composition for a lithium ion secondary battery positive electrode and a slurry composition for a lithium ion secondary battery positive electrode that can suppress expansion of a positive electrode during cycles.

It is also an object of this disclosure to provide a positive electrode for a lithium ion secondary battery that is less likely to occur expansion.

Furthermore, it is an object of this disclosure to provide a lithium ion secondary battery that suppresses performance degradation caused by expansion of a positive electrode.

Solution to Problem

The inventors have made extensive studies to solve the aforementioned problem and discovered that expansion of a positive electrode can be suppressed by using a binder composition which includes, as a binding material, a copolymer containing a nitrile group-containing monomer unit and a conjugated diene monomer unit and has a degree of swelling in electrolysis solution of at least 200 mass % and no greater than 700 mass %, and in which a binder coating resulting from film formation under specific conditions indicates a specific storage elastic modulus.

The inventors also discovered that expansion of a positive electrode can be suppressed by using a binder composition which includes, as a binding material, a copolymer containing a nitrile group-containing monomer unit, a conjugated diene monomer unit and an alkylthio group, and has a degree of swelling in electrolysis solution of at least 200 mass % and no greater than 700 mass %, and in which the alkylthio group is an alkylthio group of a carbon number from 12 to 16 having at least three tertiary or higher carbon atoms and a sulfur atom directly bonded to at least one of the tertiary or higher carbon atoms.

This disclosure has been completed based on the aforementioned findings.

Specifically, this disclosure aims to advantageously solve the aforementioned problem. The disclosed binder composition for a lithium ion secondary battery positive electrode includes a copolymer containing a nitrile group-containing monomer unit and a conjugated diene monomer unit and a solvent. A degree of swelling in electrolysis solution of the copolymer is at least 200 mass % and no greater than 700 mass %, and a storage elastic modulus of a binder coating resulting from film formation of the binder composition is at least $1 \times 10^4$ Pa and no greater than $1 \times 10^9$ Pa. In this manner, a copolymer containing a nitrile group-containing monomer unit and a conjugated diene monomer unit is used as a binding material and a degree of swelling in electrolysis solution of the copolymer and a storage elastic modulus of a binder coating are controlled within a specific range, and as a result, expansion of a positive electrode produced by using the binder composition can be suppressed.

As used in this disclosure, the phrase of a copolymer "contains a monomer unit" means that "a copolymer obtained by using the monomer contains a structural unit (repeating unit) derived from the monomer." Thus, when a copolymer is a hydrogenated copolymer resulting from hydrogenation after polymerization, the "conjugated diene monomer unit" also contains a structural unit derived from a conjugated diene monomer that is hydrogenated after being polymerized. In other words, the "conjugated diene monomer unit" contains all structural units (non-hydrogenated structural unit and hydrogenated structural unit) derived from a conjugated diene monomer.

Moreover, in this disclosure, the "binder coating" can be formed by taking a binder composition on a Teflon (Teflon is a registered trademark in Japan, other countries, or both) petri dish, drying it for one and a half hours at a temperature of 160° C. and further drying for 5 hours at a temperature of 110° C. in a vacuum dryer to yield a thickness of 50 μm.

In this disclosure, the "storage elastic modulus" of a composite film can be determined by measuring a solid viscoelasticity of a binder coating at a temperature of 25° C. and a frequency of 1 Hz in a tensile mode.

Further, in this disclosure, the "degree of swelling in electrolysis solution" of a copolymer can be measured by a measurement method described in the examples section of this specification.

In the disclosed binder composition for a lithium ion secondary battery positive electrode, the copolymer preferably contains an alkylthio group of a carbon number from 12 to 16 having at least three tertiary or higher carbon atoms and a sulfur atom directly bonded to at least one of the tertiary or higher carbon atoms. In this manner, use of a copolymer containing a specific alkylthio group allows for further suppression of expansion of a positive electrode obtained by using the disclosed binder composition.

Further, the disclosed binder composition for a lithium ion secondary battery positive electrode is a binder composition for a lithium ion secondary battery positive electrode which contains a copolymer containing a nitrile group-containing monomer unit, a conjugated diene monomer unit and an alkylthio group and a solvent, and in which a degree of swelling in electrolysis solution of the copolymer is at least 200 mass % and no greater than 700 mass %, and the alkylthio group is an alkylthio group of a carbon number from 12 to 16 having at least three tertiary or higher carbon atoms and a sulfur atom directly bonded to at least one of the tertiary or higher carbon atoms. In this manner, use of a copolymer containing a nitrile group-containing monomer unit, a conjugated diene monomer unit and a specific alkylthio group as a binding material and suppression of a degree of swelling in electrolysis solution of the copolymer within a specific range allow for suppression of expansion of a positive electrode produced by using the binder composition.

In the disclosed binder composition for a lithium ion secondary battery positive electrode, the copolymer preferably contains at least 0.03 mol of the alkylthio group per 100 mol of a monomer unit constituting the copolymer. In this manner, use of a copolymer containing a specific alkylthio group in a specific proportion allows for further suppression of expansion of a positive electrode obtained by using the disclosed binder composition.

Note that, in this disclosure, the proportion of an alkylthio group in the copolymer can be measured by a method such as NMR.

In the disclosed binder composition for a lithium ion secondary battery positive electrode, the alkylthio group is preferably at least one selected from 1,1-di(2,2-dimethylpropyl)-1-ethylthio group and 1-(2,2-dimethylpropyl)-1-(2,2,4,4-tetramethylpentyl)-1-ethylthio group. In this manner, use of a copolymer containing a specific alkylthio group allows for further suppression of expansion of a positive electrode obtained by using the disclosed binder composition.

Moreover, in the disclosed binder composition for a lithium ion secondary battery positive electrode, the iodine value of the copolymer is preferably at least 0.01 mg/100 mg and no greater than 70 mg/100 mg. The copolymer having an iodine value of at least 0.01 mg/100 mg and no greater than 70 mg/100 mg allows a positive electrode mixed material layer obtained by using the disclosed binder composition to be stronger, and thus expansion of a positive electrode can be suppressed, Note that, in this disclosure, the "iodine value" can be measured in accordance with JIS K6235 (2006).

Furthermore, in the disclosed binder composition for a lithium ion secondary battery positive electrode, it is preferable that the copolymer contains at least 5 mass % and no greater than 70 mass % of the nitrile group-containing monomer unit and at least 30 mass % and no greater than 95 mass % of the conjugated diene monomer unit. The copolymer containing at least 5 mass % and no greater than 70 mass % of nitrile group-containing monomer unit and at least 30 mass % and no greater than 95 mass % of conjugated diene monomer unit has an excellent dispersibility to the conductive agent, and thus can suppress expansion of a positive electrode.

Note that, in this disclosure, the proportion of a monomer unit in a polymer can be measured by using a technique such as NMR and pyrolysis gas chromatography.

In the disclosed binder composition for a lithium ion secondary battery positive electrode, the Mooney viscosity ($ML_{1+4}$, 100° C.) of the copolymer is preferably at least 20 and no greater than 300. If the Mooney viscosity of the copolymer is within the aforementioned range, expansion of a positive electrode can be further suppressed.

Note that, in this disclosure, the "Mooney viscosity" can be measured in accordance with JIS K6300-1.

In order to advantageously solve the aforementioned problem, the disclosed slurry composition for a lithium ion secondary battery positive electrode includes a positive electrode active material and any one of the aforementioned binder compositions for a lithium ion secondary battery positive electrode. In this manner, use of a slurry composition containing the aforementioned binder composition for a lithium ion secondary battery positive electrode allows a positive electrode produced by using the slurry composition to be less likely to expand.

Moreover, in order to advantageously solve the aforementioned problem, the disclosed positive electrode for a lithium ion secondary battery includes a positive electrode mixed material formed by using the aforementioned slurry composition for a lithium ion secondary battery positive electrode. Thus, expansion of a positive electrode for a lithium ion secondary battery produced by using the disclosed positive electrode for a lithium ion secondary battery can be suppressed.

Further, in order to advantageously solve the aforementioned problem, the disclosed lithium ion secondary battery includes the aforementioned positive electrode for a lithium ion secondary battery, a negative electrode, an electrolysis solution and a separator. In this manner, use of the aforementioned positive electrode for a lithium ion secondary battery allows for suppression of performance degradation of the battery due to expansion of a positive electrode.

Advantageous Effect

According to this disclosure, a binder composition for a lithium ion secondary battery positive electrode and a slurry composition for a lithium ion secondary battery positive electrode that can suppress expansion of a positive electrode can be provided.

Further, according to this disclosure, a positive electrode for a lithium ion secondary battery with its expansion being suppressed can be provided.

Moreover, according to this disclosure, a lithium ion secondary battery with its performance degradation caused by expansion of a positive electrode being suppressed can be provided.

DETAILED DESCRIPTION

Embodiments of this disclosure will now be described in detail below.

The disclosed binder composition for a lithium ion secondary battery positive electrode can be used when a slurry composition for a lithium ion secondary battery positive electrode is prepared. A slurry composition for a lithium ion secondary battery positive electrode prepared by using the disclosed binder composition for a lithium ion secondary battery positive electrode can be used when a positive electrode for a lithium ion secondary battery is formed. Moreover, the disclosed lithium ion secondary battery is characterized in that it employs a positive electrode for a lithium ion secondary battery formed by using the disclosed slurry composition for a lithium ion secondary battery positive electrode.

(Binder Composition for Lithium Ion Secondary Battery Positive Electrode)

The disclosed binder composition for a lithium ion secondary battery positive electrode includes a copolymer containing a nitrile group-containing monomer unit and a conjugated diene monomer unit and a solvent, and optionally further includes other components that may be mixed in a positive electrode for a lithium ion secondary battery. Further, in a binder composition for a lithium ion secondary battery positive electrode according to one embodiment of this disclosure, a degree of swelling in electrolysis solution of the copolymer is at least 200 mass % and no greater than 700 mass %, and a storage elastic modulus of a binder coating resulting from film formation of the binder composition under specific conditions is at least $1 \times 10^4$ Pa and no greater than $1 \times 10^9$ Pa. According to the disclosed binder composition for a lithium ion secondary battery positive electrode, expansion of a positive electrode formed by using the binder composition can be successfully suppressed.

Although the reason that expansion of a positive electrode itself can be suppressed by using the disclosed binder composition for a lithium ion secondary battery positive electrode has not yet been clarified, the reason is presumed to be as follows. That is, according to the disclosed binder composition for a lithium ion secondary battery positive electrode, the storage elastic modulus of the binder coating is at least $1 \times 10^4$ Pa and no greater than $1 \times 10^9$ Pa, and thus a stress remained in an electrode in a positive electrode mixed material layer produced by using the binder composition can be reduced, and as a result, expansion of a positive electrode can be suppressed. Further, a copolymer containing a nitrile group-containing monomer unit and a conjugated diene monomer unit is used as a binding material and a degree of swelling in electrolysis solution of the copolymer is at least 200% and no greater than 700%, and thus generation of expansion of a positive electrode caused by swelling of a copolymer in an electrolysis solution during storage in particular at high temperatures can be suppressed.

Further, in a binder composition for a lithium ion secondary battery positive electrode according to another embodiment of this disclosure, the copolymer contains a nitrile group-containing monomer unit, a conjugated diene monomer unit and an alkylthio group, a degree of swelling in electrolysis solution of the copolymer is at least 200 mass % and no greater than 700 mass %, and the alkylthio group has a carbon number from 12 to 16 and contains at least three tertiary or higher carbon atoms and a sulfur atom directly bonded to at least one of the tertiary or higher carbon atoms. According to the binder composition for a lithium ion secondary battery positive electrode, expansion of a positive electrode formed by using the binder composition can be successfully suppressed.

<Copolymer>

The copolymer contained in the disclosed binder composition for a lithium ion secondary battery positive electrode is a component serving as a binding material and holds, in a positive electrode produced by forming a positive electrode mixed material layer on a current collector by using a slurry composition for a secondary battery positive electrode prepared by using the binder composition, a component contained in the positive electrode mixed material layer such that the component will not be desorbed from the positive electrode mixed material layer. Further, the copolymer needs to contain a nitrile group-containing monomer unit and a conjugated diene monomer unit, and to have a degree of swelling in electrolysis solution of at least 200 mass % and no greater than 700 mass %.

The copolymer may optionally contain other monomer units so as long as the effects of this disclosure are not impaired.

Further, the copolymer is preferably a hydrogenated polymer resulting from hydrogenation of a polymer that is obtained through polymerization of a monomer composition containing a nitrile group-containing monomer and a conjugated diene monomer, and optionally further containing other monomer units in a known method.

[Nitrile Group-Containing Monomer Unit]

The nitrile group-containing monomer unit is a repeating unit derived from a nitride group-containing monomer. The aforementioned copolymer contains a nitrile group-containing monomer unit, and thus can exhibit an excellent flexibility and binding capacity.

An example of the nitrile group-containing monomer that can form a nitrile group-containing monomer unit includes an α,β-ethylenically unsaturated nitrile monomer. Specifically, α,β-ethylenically unsaturated nitrile monomer is not particularly limited as long as it is α,β-ethylenically unsaturated compound having a nitrile group, and examples include, for example, acrylonitrile; α-halogeno acrylonitrile such as α-chloro acrylonitrile and α-bromoacrylonitrile; α-alkyl acrylonitrile such as methacrylonitrile and α-ethylacrylonitrile, or the like. Of these monomers, in light of improving the binding capacity of a copolymer, acrylonitrile and methacrylonitrile are preferable and acrylonitrile is more preferable as a nitrile group-containing monomer.

Any one of such monomers can be used individually or any two or more of such monomers can be used in combination.

Provided that the percentage content of all repeating units in the copolymer is 100 mass %, the percentage content of the nitrile group-containing monomer unit in the copolymer is preferably at least 5 mass %, more preferably at least 12 mass %, even more preferably at least 30 mass %, preferably no greater than 70 mass % and more preferably no greater than 45 mass %. A copolymer that contains a nitrile group-containing monomer unit in the aforementioned percentage content has an excellent dispersibility to the conductive agent, and thus use of the aforementioned copolymer can increase the density of unpressed positive electrode mixed material layer that is formed by applying the slurry composition that includes the disclosed binder composition on a current collector. As a result thereof, when a positive electrode having a positive electrode mixed material layer is obtained by subjecting an unpressed positive electrode mixed material layer to pressure processing such as press, a large displacement of the positive electrode mixed material layer during pressure processing can be suppressed. Thus, the positive electrode structure is prevented from being fractured during manufacture, and expansion of a positive electrode produced by using the disclosed binder composition can be successfully suppressed. Further, the copolymer contains a nitrile group-containing monomer unit in the aforementioned percentage content, and thus swelling property of the copolymer relative to the electrolysis solution can be successfully controlled.

[Conjugated Diene Monomer Unit]

The conjugated diene monomer unit is a repeating unit derived from a conjugated diene monomer and includes all structural units derived from a conjugated diene monomer. Specifically, when the copolymer is a hydrogenated copolymer resulting from hydrogenation of the copolymer obtained through polymerization of a monomer composition including a nitrile group-containing monomer and a conjugated diene monomer, a conjugated diene monomer unit of the copolymer includes a non-hydrogenated structural unit that is not hydrogenated after being polymerized and a hydrogenated structural unit that is hydrogenated after being polymerized. Further, the copolymer contains a conjugated diene monomer unit, and thus can exhibit an excellent stability to the electrolysis solution.

Examples of conjugated diene monomer that can form a conjugated diene monomer unit include, for example, 1,3-butadiene, isoprene, 2,3-dimethyl-1,3-butadiene, 2-ethyl-1,3-butadiene, 1,3-pentadiene, 2-chloro-1,3-butadiene or the like. Of these conjugated diene monomers, 1,3-butadiene is preferred. Any one of such monomers can be used individually or any two or more of such monomers can be used in combination.

Provided that the percentage content of all repeating units in the copolymer is 100 mass %, the percentage content of the conjugated diene monomer unit in the copolymer is preferably at least 30 mass %, more preferably at least 55 mass %, preferably no greater than 95 mass %, more preferably no greater than 88 mass % and even more preferably no greater than 70 mass %. A copolymer containing a conjugated diene monomer unit in the aforementioned percentage content has an excellent dispersibility to the conductive agent, and thus if the aforementioned copolymer is used, the density of an unpressed positive electrode mixed material layer formed by applying a slurry composition containing the disclosed binder composition on a current collector can be improved. As a result thereof, when a positive electrode having a positive electrode mixed material layer is obtained by subjecting an unpressed positive electrode mixed material layer to pressure processing such as press, a large displacement of the positive electrode mixed material layer during pressure processing can be suppressed. Thus, the area where a residual stress is generated during manufacture of positive electrode and the amount of the residual stress can be reduced. Consequently a positive electrode structure is prevented from being fractured during manufacture, and expansion of a positive electrode produced by using the disclosed binder composition can be successfully suppressed. Further, the copolymer contains a nitrile group-containing monomer unit in the aforementioned percentage content, and thus swelling property of copolymer relative to the electrolysis solution can be successfully controlled.

[Other Monomer Units]

The other monomers that can form the other monomer units are not particularly limited, and examples thereof include a monomer known in the art that can be copolymerized with the aforementioned monomers, such as (meth)acrylic acid ester monomer.

Note that any one of such monomers can be used individually or any two or more of such monomers can be used in combination. Note that, in this disclosure, "(meth)acrylic" means "acrylic" and/or "methacrylic".

Examples of (meth)acrylic acid ester monomer include alkyl acrylates such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate and stearyl acrylate; methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate and stearyl methacrylate, or the like.

Of the aforementioned examples, a (meth)acrylic acid ester monomer is preferred as the other monomers.

The percentage content of the other monomer unit contained in the copolymer is preferably no greater than 20 mass % and more preferably no greater than 10 mass %.

[Alkylthio Group]

In the disclosed one embodiment, it is preferable that the aforementioned copolymer contains an alkylthio group of a carbon number from 12 to 16 having at least three tertiary or higher carbon atoms and a sulfur atom directly bonded to at least one of the tertiary or higher carbon atoms.

Further, in the disclosed other embodiment, the aforementioned copolymer contains an alkylthio group of a carbon number from 12 to 16 having at least three tertiary or higher carbon atoms and a sulfur atom directly bonded to at least one of the tertiary or higher carbon atoms.

In this manner, use of a copolymer containing a specific alkylthio group allows for further suppression of expansion of a positive electrode.

The proportion of the alkylthio group is preferably at least 0.03 mol, more preferably at least 0.1 mol and preferably no greater than 3 mol per 100 mol of a monomer unit constituting the copolymer.

The alkylthio group is preferably at least one selected from 1,1-di(2, 2-dimethylpropyl)-1-ethylthio group and 1,1-di(2,2-dimethylpropyl)-1-(2,2,4,4-tetramethylpentyl)-1-ethylthio group. They can be contained alone or in combination in one molecule. Of them, an alkylthio group having at least one tertiary carbon atom, at least two quaternary carbon atoms and a sulfur atom directly bonded to at least one of the tertiary carbon atoms, in which the tertiary carbon atom to which the sulfur atom is bonded is located between any two quaternary carbon atoms is preferred, and in particular, 1,1-di (2,2-dimethylpropyl)-1-ethylthio group is preferred.

Note that the alkylthio group can be introduced into a copolymer molecule by using alkylthiol compounds corresponding to the alkylthio group during preparation of a copolymer.

[Degree of Swelling in Electrolysis Solution]

A degree of swelling in electrolysis solution of the copolymer needs to be at least 200 mass % and no greater than 700 mass %. It is preferably at least 220 mass %, preferably no greater than 500 mass %, more preferably no greater than 400 mass % and even more preferably no greater than 300 mass %. If a degree of swelling in electrolysis solution of the copolymer is defined within the aforementioned range, generation of expansion of a positive electrode caused by swelling of a copolymer in an electrolysis solution can be suppressed during storage at high temperatures in particular.

[Iodine Value]

The iodine value of the copolymer is preferably at least 0.01 mg/100 mg and no greater than 70 mg/100 mg. The iodine value of a copolymer is preferably at least 1 mg/100 mg, more preferably at least 5 mg/100 mg, preferably no greater than 20 mg/100 mg and more preferably no greater than 15 mg/100 mg.

The copolymer having the iodine value of at least 0.01 mg/100 mg and no greater than 70 mg/100 mg has an appropriate curability. Thus, when positive electrodes are produced by using the disclosed binder composition, thermal processing is applied after pressure processing such as press so that electrodes are heated and cured, which allows the positive electrode mixed material layer to be strong and the stress inside a positive electrode to be reduced, and as a result, expansion of a positive electrode can be suppressed.

Note that the iodine value of a copolymer can be adjusted by changing the type, proportion, hydrogenated conditions or the like of a monomer unit constituting a copolymer.

[Mooney Viscosity]

Further, the Mooney viscosity of the copolymer is preferably at least 20 and no greater than 300. The Mooney viscosity of a copolymer is more preferably at least 30, even more preferably at least 50, more preferably no greater than 150 and even more preferably no greater than 100. If the Mooney viscosity of a copolymer is defined within the aforementioned range, the residual stress in a positive electrode mixed material layer obtained by using the disclosed binder composition is eased, and thus expansion of a positive electrode can be further suppressed.

[Preparation Method of Copolymer]

Note that, although a preparation method of the copolymer is not particularly limited, a copolymer can be prepared, for example, by polymerizing a monomer composition containing the aforementioned monomer to obtain a copolymer and optionally hydrogenating (hydrogenation) the obtained copolymer.

In this disclosure, the percentage content of each monomer in a monomer composition may be determined in accordance with the percentage content of each monomer unit in a copolymer.

A polymerization method is not particularly limited, and any method such as a solution polymerization method, a suspension polymerization method, a bulk polymerization method and an emulsion polymerization method may be used. Further, any polymerization reaction such as ionic polymerization, radical polymerization and living radical polymerization may be used. Upon polymerization, any of the emulsifiers and/or polymerization initiators known in the art can be used where necessary.

The aforementioned hydrogenated method of copolymer is not particularly limited, and a general method that uses catalyst (see, for example, WO2012/165120A1, WO2013/080989A1 and JP2013-008485A) may be used.

Further, if a specific alkylthiol compound is added to a monomer composition used for polymerization, the copolymer that contains the aforementioned specific alkylthio group can be provided. An alkylthiol compound serving as a molecular weight modifier (chain transfer agent) may be used as the aforementioned alkylthiol compound, and a t-dodecyl mercaptan (TDM) or an alkylthiol compound of a carbon number from 12 to 16 that includes at least three tertiary or higher carbon atoms and a sulfur atom directly bonded to at least one of the tertiary or higher carbon atoms may be used, for example. As the alkylthiol compound, 2,2',4,6,6'-pentamethylheptane-4-thiol (TIBM), 2,2',4,6,6',8,8'-heptamethylnonane-4-thiol and t-dodecyl mercaptan are preferably used. Of these compounds, it is preferable to use an alkylthiol compound having at least one tertiary carbon atom, at least two quatenary carbon atoms and a sulfur atom directly bonded to at least one of the tertiary carbon atoms, in which the tertiary carbon atom to which the sulfur atom is bonded is located between any two quatenary carbon atoms. It is further preferable to use 2,2',4,6,6'-pentamethylheptane-4-thiol and/or 2,2',4,6,6',8,8'-heptamethylnonane-4-thiol, and it is particularly preferable to use 2,2',4,6,6'-pentamethylheptane-4-thiol.

Note that the alkylthiol compound serves as a molecular weight modifier, and an amount of molecular weight modifier to be used is normally from 0.05 parts by weight to 3 parts by weight, and is preferably from 0.1 parts by weight to 1 part by weight per 100 parts by weight of the monomer composition for copolymerization. The amount of use in this range is advantageous for adjustment of the molecular weight of a copolymer to be obtained.

The aforementioned alkylthiol compounds may respectively be used individually or in combination. The alkylthiol compounds may also be used with other molecular weight modifiers where necessary. In that case, the alkylthiol compound is preferably at least 50 mass %, more preferably at least 80 mass %, and even more preferably at least 95 mass % of the total molecular weight modifier to be used.

<Solvent>

Solvent is not particularly limited, and organic solvents may be used. Examples of organic solvent include, for example, alcohols such as methanol, ethanol, n-propanol, isopropanol, n-butanol, isobutanol, t-butanol, pentanol, hexanol, heptanol, octanol, nonanol, decanol and amylalcohol; ketones such as acetone, methyl ethyl ketone and cyclohexanone; esters such as ethyl acetate and butyl acetate; ethers such as diethyl ether, dioxane and tetrahydrofuran; amide based polar organic solvent such as N,N-dimethylformamide and N-methyl-2-pyrrolidone (NMP); and aromatic hydrocarbons such as toluene, xylene, chlorobenzene, ortho-dichlorobenzene, para-dichlorobenzene. Any one of the aforementioned solvents may be used individually or any mixture of two or more thereof may be used.

Among the aforementioned solvents, NMP is preferable.

<Other Components>

The disclosed binder composition may contain, in addition to the aforementioned components, components such as reinforcing material, leveling agent, viscosity modifier and electrolysis solution additive. These components are not particularly limited as long as they do not affect the battery reaction, and commonly known materials such as described in WO 2012/115096 A1 may be used. Any one of these components may be used individually or two or more thereof may be used in combination at an optional ratio.

<Properties of Binder Coating>

According to one embodiment of this disclosure, when the disclosed binder composition is taken on a Teflon (Teflon is a registered trademark in Japan, other countries, or both) petri dish to yield a thickness of 50 μm after being dried, then is dried for one and a half hours at a temperature of 160° C. and further dried for 5 hours at a temperature of 110° C. in a vacuum dryer to yield a binder coating that contains the aforementioned copolymer, the resultant composite coating needs to have specific properties.

[Storage Elastic Modulus]

The storage elastic modulus of the aforementioned binder coating is preferably at least $1 \times 10^4$ Pa and no greater than $1 \times 10^9$ Pa, more preferably at least $1 \times 10^5$ Pa, even more preferably at least $1 \times 10^6$ Pa, more preferably no greater than $1 \times 10^8$ Pa, and even more preferably no greater than $1 \times 10^7$ Pa. If the storage elastic modulus of the binder coating is within the aforementioned range, the residual stress in a positive electrode formed by using a binder composition is eased and expansion of a positive electrode produced by using the binder composition can be suppressed.

Note that the storage elastic modulus of a binder coating can be adjusted by changing the type and proportion of the monomer unit constituting the copolymer, the weight-average molecular weight of the copolymer, the iodine value, the amount of alkylthiol group or the like.

(Slurry Composition for Lithium Ion Secondary Battery Positive Electrode)

The disclosed slurry composition for a lithium ion secondary battery positive electrode includes a positive electrode active material and the aforementioned binder composition, and optionally further includes a conductive material and other components. That is, the disclosed slurry composition for a lithium ion secondary battery positive electrode includes a positive electrode active material, the aforementioned copolymer and a solvent, and optionally further includes a conductive material and other components. The disclosed slurry composition for a lithium ion secondary battery positive electrode includes the aforementioned binder composition, and thus expansion of a positive electrode produced by using the slurry composition can be suppressed.

<Positive Electrode Active Material>

The positive electrode active material is a material that transfers electrons from a positive electrode of a lithium ion secondary battery. As the positive electrode active material for a lithium ion secondary battery, a material that can occlude and release lithium is normally used.

Specifically, a positive electrode active material for a lithium ion secondary battery is not particularly limited and examples include known positive electrode active materials such as lithium-containing cobalt oxide ($LiCoO_2$), lithium manganate ($LiMn_2O_4$), lithium-containing nickel oxide ($LiNiO_2$), Co—Ni—Mn lithium-containing complex oxide (Li (Co Mn Ni) $O_2$), Ni—Mn—Al lithium-containing complex oxide, Ni—Co—Al lithium-containing complex oxide, olivine-type lithium iron phosphate ($LiFePO_4$), olivine type manganese lithium phosphate ($LiMnPO_4$), lithium-rich spinel compounds represented by $Li_{1+x}Mn_{2-x}O_4$ (O<X<2) and Li $[Ni_{0.17}Li_{0.2}Co_{0.07}Mn_{0.56}]O_2$ and $LiNi_{0.5}Mn_{1.5}O_4$.

Among the aforementioned materials, in light of improving the battery capacity of a secondary battery, as a positive electrode active material, it is preferable to use lithium-containing cobalt oxide ($LiCoO_2$), lithium-containing nickel oxide ($LiNiO_2$), Co—Ni—Mn lithium-containing complex oxide, $Li[Ni_{0.17}Li_{0.2}Co_{0.07}Mn_{0.56}]O_2$ or $LiNi_{0.5}Mn_{1.5}O_4$, and it is more preferable to use lithium-containing cobalt oxide ($LiCoO_2$), $Li[Ni_{0.17}Li_{0.2}Co_{0.07}Mn_{0.56}]O_2$ or $LiNi_{0.5}Mn_{1.5}O_4$.

Note that the blending amount and the particle diameter of a positive electrode active material are not particularly limited, and may be the same as those of positive electrode active materials that have been used.

<Binder Composition>

As a binder composition, the aforementioned disclosed binder composition for a lithium ion secondary battery positive electrode is used.

In terms of solid content, the blending amount of the binder composition is preferably at least 0.5 parts by mass, more preferably at least 1 parts by mass, even more preferably at least 1.5 parts by mass and preferably no greater than 2 parts by mass per 100 parts by mass of positive electrode active material. If the blending amount of a binder composition per 100 parts by mass of positive electrode active material is at least 0.5 parts by mass in terms of solid content, expansion of a positive electrode produced by using the slurry composition can be sufficiently suppressed.

<Conductive Material>

A conductive material is used to secure electrical contact between positive electrode active materials. Examples of conductive material include conductive carbon materials such as carbon black (e.g. acetylene black, Ketjen black (Ketjen black is a registered trademark in Japan, other counties, or both), furnace black), graphite, carbon fiber, carbon flakes, carbon nanofibers (e.g. carbon nanotubes or vapor-grown carbon fiber); fibers and foils of various metals. Among them, as a conductive material, carbon black is preferable, and acetylene black is more preferable.

Any one of such materials can be used individually or any two or more of such materials can be used in combination.

The blending amount of the conductive material is preferably at least 1 part by mass, more preferably at least 1.2 parts by mass, even more preferably at least 1.5 parts by mass, preferably no greater than 8 parts by mass, more preferably no greater than 3 parts by mass and even more preferably no greater than 2 parts by mass per 100 parts by mass of positive electrode active material. If the blending amount of conductive material is too small, electrical contact between positive electrode active materials may not be secured sufficiently. On the other hand, if the blending amount of conductive material is too much, the viscosity stability of a slurry composition may be reduced and the density of a positive electrode mixed material layer in a positive electrode may be reduced as well, and as a result, the capacity of a secondary battery may not be increased sufficiently.

<Other Components>

The other components that may be blended in a slurry composition are not particularly limited, and examples of the other components may include the same components as those that may be blended in the disclosed binder composition. Any one of these components may be used individually or two or more thereof may be used in combination at an optional ratio.

<Preparation of Slurry Composition>

The aforementioned slurry composition can be prepared by dissolving or dispersing the aforementioned each component in a solvent such as an organic solvent. Specifically, a slurry composition can be prepared by mixing the aforementioned each component with a solvent using a mixer such as a ball mill, a sand mill, a bead mill, a pigment disperser, a grinding machine, an ultrasonic disperser, a homogenizer, a planetary mixer and a FILMIX. Note that a solvent contained in a binder composition may be used as a solvent used for preparation of a slurry composition.

(Positive Electrode for Lithium Ion Secondary Battery)

The disclosed positive electrode for a lithium ion secondary battery includes a current collector and a positive electrode mixed material layer formed on the current collector, and the positive electrode mixed material layer is formed by using the aforementioned slurry composition for a lithium ion secondary battery positive electrode. That is, the positive electrode mixed material layer contains at least a positive electrode active material and a copolymer. Note that each component contained in the electrode mixed material layer has been contained in the aforementioned slurry composition for a lithium ion secondary battery positive electrode, and each component is present preferably in the same ratio as the preferred ratio of each component present in the slurry composition.

The disclosed positive electrode for a lithium ion secondary battery is produced by using a slurry composition that contains the disclosed binder composition for a lithium ion secondary battery positive electrode, and thus use of the positive electrode allows for suppression of performance degradation caused by expansion of a positive electrode.

<Production Method of Positive Electrode>

Note that the disclosed positive electrode for a lithium ion secondary battery can be produced, for example, through the processes of applying the aforementioned slurry composition on a current collector (applying process) and drying the slurry composition applied on the current collector to form a positive electrode mixed material layer on the current collector (drying process).

[Applying Process]

The method of applying the aforementioned slurry composition on a current collector is not particularly limited, and any of the methods known in the art may be used. Specifically, as an applying method, doctor blading, dip coating, reverse roll coating, direct roll coating, gravure coating, extrusion coating and brush coating may be used. A slurry composition may be applied only on one side or on both sides of the current collector. The thickness of the slurry coating on the current collector after applying but before drying may be set as appropriate in accordance with the thickness of a positive electrode mixed material layer obtained after drying.

As a current collector on which the slurry composition is applied, a material having an electrical conductivity and an electrochemical durability is used. Specifically, the current collector may, for example, be made of iron, copper, aluminum, nickel, stainless steel, titanium, tantalum, gold, or platinum. Among them, aluminum foil is particularly preferable as a current collector used for a positive electrode. Any one of the aforementioned materials may be used individually or two or more thereof may be used in combination at an optional ratio.

[Drying Process]

The drying method of a slurry composition applied onto the current collector is not particularly limited, and any method known in the art may be used. Examples of drying method include drying by warm, hot, or low-humidity air, drying in a vacuum, and drying by irradiation with infrared light, electron beams, or the like. Through drying of the slurry composition on the current collector as described above, a positive electrode mixed material layer is formed on the current collector and thus a positive electrode for a lithium ion secondary battery including a current collector and a positive electrode mixed material layer can be obtained.

Note that, after the drying process, a positive electrode mixed material layer may be subjected to pressure processing by using a mold press or a roll press. The pressure processing may improve close adherence between the positive electrode mixed material layer and the current collector.

Furthermore, when the positive electrode mixed material layer contains a curable polymer, the polymer is preferably cured after formation of the positive electrode mixed material layer.

(Lithium Ion Secondary Battery)

The disclosed lithium ion secondary battery includes a positive electrode, a negative electrode, an electrolysis solution and a separator, and employs the disclosed positive electrode for a secondary battery as a positive electrode. The disclosed lithium ion secondary battery includes the disclosed positive electrode for a secondary battery, and thus can suppress performance degradation of a battery caused by expansion of a positive electrode during storage at high temperatures or repetition of charging and discharging.

<Negative Electrode for Lithium Ion Secondary Battery>

A known negative electrode can be used as a negative electrode for a lithium ion secondary battery. Specifically, as a negative electrode for a lithium ion secondary battery, a negative electrode formed by a thin sheet of metal lithium or a negative electrode obtained by forming a negative electrode mixed material layer on a current collector may be used.

Note that the current collector may be made of metal material such as iron, copper, aluminum, nickel, stainless steel, titanium, tantalum, gold and platinum. A layer containing a negative electrode active material and a binding material can be used as a negative electrode mixed material layer. Furthermore, a binding material is not particularly limited and any known materials may be used.

<Electrolysis Solution>

The electrolysis solution is normally an organic electrolysis solution obtained by dissolving a supporting electrolyte in an organic solvent. Specifically, the supporting electrolyte may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, $(C_2F_5SO_2)NLi$ or the like. Among these lithium salts, $LiPF_6$, $LiClO_4$ and $CF_3SO_3Li$ are preferable and $LiPF_6$ is particularly preferable in that they easily dissolve in solvent and exhibit a high degree of dissociation. Note that one electrolyte may be used individually or two or more electrolytes may be used in combination at an optional ratio. In general, lithium ion conductivity tends to increase as a degree of dissociation of the supporting electrolyte increases, and thus lithium ion conductivity can be adjusted depending on the type of supporting electrolyte.

The organic solvent used in the electrolysis solution is not particularly limited as long as the supporting electrolyte can dissolve therein. Examples of the organic solvent that are preferably used include, for example, carbonates such as dimethyl carbonate (DMC), ethylene carbonate (EC), diethyl carbonate (DEC), propylene carbonate (PC), butylene carbonate (BC) and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. The mixed solution of these solvents may be used. Among these solvents, carbonates are preferable for their high dielectric constant and broad stable potential region, and a mixture of ethylene carbonate and ethyl methyl carbonate is more preferable.

Note that the electrolyte concentration in the electrolysis solution can be adjusted as needed. For example, the electrolyte concentration is preferably from 0.5 mass % to 15 mass %, more preferably from 2 mass % to 13 mass %, and even more preferably from 5 mass % to 10 mass %. Further, known additives such as fluoroethylene carbonate or ethyl methyl sulfone may be added to electrolysis solution.

<Separator>

The separator is not particularly limited and the separators described in JP2012-204303 A may be used. Among them, a fine porous membrane made of polyolefinic (i.e., polyethylene, polypropylene, polybutene and polyvinyl chloride) resin is preferred, since such a membrane can reduce the total thickness of the separator and as a result, the ratio of the electrode active material in the secondary battery is increased and consequently the capacity per volume can be increased.

<Production Method of Lithium Ion Secondary Battery>

The disclosed lithium ion secondary battery may be produced, for example, by stacking a positive electrode for a lithium ion secondary battery and a negative electrode for a lithium ion secondary battery with a separator in-between, rolling or folding the resultant stack as necessary in accordance with the battery shape to place the stack in a battery container, filing the battery container with the electrolysis solution and sealing the battery container. In order to prevent pressure increase inside the lithium ion secondary battery and occurrence of overcharging or overdischarging, an overcurrent preventing device such as a fuse or a PTC device, an expanded metal or a lead plate may be provided as necessary. The shape of the lithium ion secondary battery may be a coin type, a button type, a sheet type, a cylinder type, a prismatic type, a flat type, or the like.

EXAMPLES

The following provides a more specific description of the disclosure based on examples. However, this disclosure is not limited to the following examples. In the following, "%" and "parts" used to express quantities are by mass, unless otherwise specified.

Moreover, in the case of a copolymer that is produced through copolymerization of a plurality of types of monomers, the proportion of a structural unit in the polymer that is formed through polymerization of a given monomer is normally, unless otherwise specified, the same as the ratio (charging ratio) of the given monomer among all monomers used in polymerization of the copolymer.

In the examples and comparative examples, the proportion of a specific alkylthiol group in the copolymer, the iodine value of the copolymer, the degree of swelling in electrolysis solution, the Mooney viscosity, the storage elastic modulus of binder coating, the electrode swelling ratio during storage at high temperatures and the electrode swelling ratio during cycles were measured and evaluated by the following method.

<Proportion of Specific Alkylthio Group>

The copolymer was dissolved in benzene and operation of solidifying the copolymer in methyl alcohol was repeated three times for purification, and the resultant purified copolymer was subjected to an NMR measurement.

A peak caused by a proton of a terminal methyl group in the alkylthio group was detected near 1.05 ppm by the $^1$H-NMR-measurement (400 MHz), and furthermore, a peak caused by a carbon of a methylene group in the alkylthio group was detected near 54.6 ppm by the $^{13}$C-NMR measurement (100 MHz). Concentration determination of the alkylthio group in the copolymer was calculated by using a ratio of an integral value of a peak caused by a terminal methyl group by the $^1$H-NMR-measurement to an integral value of a peak caused by a proton bonded to an unsaturated bond of a conjugated diene monomer unit detected near from 4.8 to 5.8 ppm.

<Iodine Value of Copolymer>

Aqueous dispersion 100 g of the copolymer was coagulated in 1 L of methanol and then was dried in a vacuum for 12 hours at a temperature of 60° C. The iodine value of a resultant dried copolymer was measured in accordance with JIS K6235 (2006).

<Degree of Swelling in Electrolysis Solution>

A 1 cm×1 cm film (thickness 500 μm) was produced by applying the aqueous dispersion of copolymer to an electrolytic copper foil (NC-WS (a registered trademark in Japan, other countries, or both) produced by Furukawa Electric Co., Ltd.) using a table coater and drying with a hot air dryer for 20 minutes at a temperature of 50° C. and for 20 minutes at a temperature of 120° C., and a weight of M0 was measured. After that, the resultant film was immersed in an electrolysis solution for 72 hours at a temperature of 60° C. The electrolysis solution was prepared by dissolving LiPF$_6$ as a supporting electrolyte into a mixture solvent of ethylene carbonate (EC), diethyl carbonate (DEC) and vinylene carbonate (VC) (mixing ratio by volume: EC/DEC/VC=68.5/30/1.5) at a concentration of 1 mol/L. After immersion, the electrolysis solution was wiped from the surface of the film and the weight M1 was measured. Then a degree of swelling in electrolysis solution was calculated according to the following equation:

$$\text{Degree of swelling in electrolysis solution} = M1/M0.$$

<Mooney Viscosity>

The Mooney viscosity (ML$_{1+4}$, 100° C.) of the copolymer was measured in accordance with JISK6300-1.

<Storage Elastic Modulus of Binder Coating>

Binder composition was taken on a Teflon (Teflon is a registered trademark in Japan, other countries, or both) petri dish to obtain a thickness of 50 μm after drying. After that, the binder composition was dried for one and a half hours at a temperature or 160° C. and further dried in a vacuum for 5 hours at a temperature of 110° C. to obtain a binder coating. The viscoelasticity of the obtained binder coating was measured by using a viscoelasticity spectrometer (DMS) (DMS6100 standard type from SII NanoTechnology Inc.) with a minimum tensile force of 98.0 mN, a temperature of 25° C., a tensile mode (correction of specimen expansion: adjusted by an automatic measurement mode), a distance between chucks of 10 mm and a specimen width of 10 mm, and a storage elastic modulus in the range from 0.1 to 10 Hz (0.1 Hz, 0.2 Hz, 0.5 Hz, 1 Hz, 2 Hz, 5 Hz and 10 Hz) was measured.

<Swelling Ratio of Positive Electrode During Storage at High Temperatures>

Six pieces of secondary batteries were produced and three of them were charged to a cell voltage of 4.2 V in an atmosphere of 25° C. by a 0.2 C constant-current method and were subsequently discharged to 3.0 V. Subsequently the batteries were disassembled to take out positive electrodes. The thickness of each positive electrode before being stored was measured to find an average value. Subsequently the remaining three secondary batteries were charged to a cell voltage of 4.2 V by a 0.2 C constant-current method in an atmosphere of 25° C. The batteries in a charged state were stored (at high temperatures) in a 60° C. thermostatic chamber for one week. After storage at high temperatures, the batteries were discharged to 3 V by a 0.2 C constant current/constant voltage method to adjust the voltage, and the thickness of each positive electrode after storage was measured. Then a ratio of the thickness of the positive electrode after storage to the thickness of the positive electrode before storage that has been previously measured (=the thickness after storage/the thickness before storage)× 100) (%) was calculated and defined as an electrode swelling ratio.

<Positive Electrode Swelling Ratio During Cycles>

Six pieces of secondary batteries were produced and three of them were charged to a cell voltage of 4.2 V in an atmosphere of 25° C. by constant-current method at 0.2 C and were subsequently discharged to 3.0 V. Subsequently the batteries were disassembled to take out positive electrodes. The thickness of each positive electrode before a cycle was measured to find an average value. Subsequently the remaining three secondary batteries were subjected to an operation of charging to 4.2 V in an environment of 25° C. at a 0.2 C and discharging to 3.0V, three times in repetition. After that, the batteries were subjected to an operation of charging to 4.2 V in an environment of 45° C. at 1 CmA and discharging to 3.0 V at 1 CmA, one hundred times in repetition. After that, the batteries were discharged to 3 V by constant current/constant voltage method at 10.2 C, and voltages were adjusted to measure a thickness of each positive electrode after cycles. The ratio of the thickness of the positive electrode after cycles to the thickness of the positive electrode before cycles that has been previously measured (=the thickness after cycles/the thickness before cycle)×100) (%) was calculated and defined as a positive electrode swelling ratio.

Evaluation was made in accordance with the following criteria based on the swelling ratio of the resultant positive electrode during cycles.

A: Positive electrode swelling ratio during cycles is no greater than 110%
B: Positive electrode swelling ratio during cycles is greater than 110% and no greater than 115%
C: Positive electrode swelling ratio during cycles is greater than 115% and no greater than 120%
D: Positive electrode swelling ratio during cycles is greater than 120% and no greater than 125%
E: Positive electrode swelling ratio during cycles is greater than 125%

Example 1

<Preparation of Copolymer>

In a reactor with an internal volume of 10 liters, 100 parts of ion-exchanged water, 35 parts by mass of acrylonitrile and 65 parts by mass of 1,3-butadiene were charged, 2 parts of potassium oleate as an emulsifier, 0.1 parts of potassium phosphate as a stabilizer and further 0.5 parts of 2,2',4,6,6'-pentamethylheptane-4-thiol (TIBM) as a molecular weight modifier were added therein, and emulsion polymerization was performed at a temperature of 30° C. in the presence of 0.35 parts of potassium persulfate as a polymerization initiator to copolymerize butadiene and acrylonitrile.

When the polymerization conversion rate reached 90%, 0.2 parts of hydroxylamine sulfate were added per 100 parts of monomer to terminate polymerization. Subsequently, the reactor was heated to collect residual monomer by steam distillation at a temperature of about 70° C. under a reduced pressure. After that, 2 parts of alkylated phenol were added as an antioxidant to obtain aqueous dispersion of a polymer.

Subsequently the resultant 400 mL (total solid content: 48 g) of aqueous dispersion of polymer was loaded into a 1 L autoclave with a stirrer, and nitrogen gas was flowed for 10 minutes to remove oxygen dissolved in a copolymer solution. After that, as a hydrogenation reaction catalyst, 50 mg of palladium acetate was dissolved in 180 mL of water to which nitric acid had been added in an amount of four molar equivalents of the Pd, and the resultant solution was added. After purging the system twice with hydrogen gas, the contents of the autoclave were heated to 50° C. in a state in which the hydrogen gas pressure was raised to 3 MPa, and a hydrogenation reaction was carried out for 6 hours.

After that, the contents of the autoclave were returned to a room temperature and the system was changed to a nitrogen atmosphere. After that, the contents were concentrated by using an evaporator until a solid content concentration of 40% was obtained. As a result, an aqueous dispersion of a copolymer containing a nitrile group-containing monomer unit and a conjugated diene monomer unit was obtained.

Then, the iodine value, the degree of swelling in electrolysis solution and the Mooney viscosity of the resultant copolymer were measured. The results are shown in Table 1.

<Preparation of Binder Composition for Lithium Ion Secondary Battery Positive Electrode>

In terms of solid content, 0.3 parts of aqueous dispersion of copolymer and an appropriate amount of N-methyl-2-pyrrodidone (NMP) were mixed and all of the water was evaporated under reduced pressure to obtain a binder composition containing both copolymer and solvent. Then a binder coating was formed by using the obtained binder composition and a storage elastic modulus of the binder coating was evaluated. The results are shown in Table 1.

<Preparation of Slurry Composition for Lithium Ion Secondary Battery Positive Electrode>

A slurry composition for a lithium ion secondary battery positive electrode was prepared by stirring 100 parts of $LiCoO_2$ (volume average particle diameter: 12 μm) as a positive electrode active material, 2 parts of acetylene black (Denka Black (registered trademark) in powder form produced by Denki Kagaku Kogyo K. K, a volume-average particle diameter: 35 nm, BET specific surface area: 68 $m^2/g$) as a conductive material, 2 parts by solid content equivalents of the aforementioned binder composition and an appropriate amount of N-methyl-2-pyrrodidone (NMP) in a planetary mixer.

<Production of Positive Electrode for Lithium Ion Secondary Battery>

Aluminum foil of 15 μm in thickness was prepared as a current collector. Then, the aforementioned slurry composition for a lithium ion secondary battery positive electrode was applied to both sides of the aluminum foil so that the coating amount after drying could be 20 mg/$cm^2$, and then dried for 20 minutes at 60° C. and for 20 minutes at 120° C.

to obtain a positive electrode web having an unpressed positive electrode mixed material layer. This positive electrode web was rolled by a roll press to produce a positive electrode in the form of a sheet composed of a positive electrode mixed material layer with a density of 3.9 g/cm$^3$ and aluminum foil, and after that, subjected to thermal processing for 2 hours at 150° C. The positive electrode in the form of a sheet was then cut into a width of 4.8 mm and a length of 50 cm to yield a positive electrode for a lithium ion secondary battery.

<Production of Negative Electrode for Lithium Ion Secondary Battery>

A mixture of 90 parts of spherical artificial graphite (volume average particle size: 12 μm) and 10 parts of SiO$_x$ (volume average particle size: 10 μm) as a negative electrode active material, 1 part of styrene butadiene polymer as a binder, 1 part of carboxymethyl cellulose as a thickener, and an appropriate amount of water as a dispersion medium were stirred in a planetary mixer to prepare a slurry composition for a secondary battery negative electrode.

Next, a copper foil with a thickness of 15 μm was prepared as a current collector. Then the slurry composition for a secondary battery negative electrode was applied to both sides of the copper foil so that the coating amount after drying could be 10 mg/cm$^2$, and the slurry composition was then dried for 20 minutes at 60° C. and for 20 minutes at 120° C. Subsequently, the resultant slurry composition was subjected to thermal processing for 20 minutes at 150° C. to obtain a negative electrode web. This negative electrode web was rolled by a roll press to produce a negative electrode in the form of a sheet composed of a negative electrode mixed material layer with a density of 1.8 g/cm$^3$ and copper foil. The negative electrode in the form of a sheet was then cut into a width of 5.0 mm and a length of 52 cm to yield a negative electrode for a lithium ion secondary battery.

<Production of Lithium Ion Secondary Battery>

The produced positive electrode for a lithium ion secondary battery and the negative electrode for a lithium ion secondary battery were wound around a 20 mm diameter core with a separator with a thickness of 15 μm therebetween (fine porous membrane of polypropylene) to yield a wound body. The resultant wound body was compressed in one direction at a rate of 10 mm/second until a thickness of 4.5 mm is obtained. Note that the compressed wound body had an elliptical shape in plan view, and the ratio of the major axis to the minor axis (major axis/minor axis) was 7.7.

Further, an electrolysis solution (LiPF$_6$ solution having a concentration of 1.0 M (the solvent is a mixture yielded by adding 5 mass % of the fluoroethylene carbonate to mixed solvent of ethylene carbonate/ethyl methyl carbonate in a 3/7 mass ratio, with an addition of 2% by volume of vinylene carbonate as additive agent) was prepared.

After that, the compressed wound body was housed in an aluminum laminate case along with 3.2 g of non-aqueous electrolysis solution. After connecting a nickel lead wire to a specific position of the negative electrode for a secondary battery and connecting an aluminum lead wire to a specific position of the positive electrode for a secondary battery, the opening of the case was thermally sealed to obtain a lithium ion secondary battery. This lithium ion secondary battery had a pouch-shape with a width of 35 mm, a height of 48 mm, and a thickness of 5 mm, and the nominal capacity of the battery was 700 mAh.

Then an electrode swelling ratio during storage at high temperatures and an electrode swelling ratio during cycles were measured by using the produced lithium ion secondary battery. The results are shown in Table 1.

Example 2

A copolymer, a binder composition for a positive electrode, a slurry composition for a positive electrode, a positive electrode, a negative electrode and a secondary battery were produced in the same manner as those described in Example 1 except that the amount of 1,3-butadiene was changed to 55 parts, 10 parts of n-butyl acrylate was further used as the other monomer during preparation of a copolymer, reaction time and hydrogen pressure were changed during hydrogenation reaction, and a reaction was finished with the iodine value in Table 1 as an end point, and were evaluated in the same manner as described in Example 1. The results are shown in Table 1.

Examples 3-5

A copolymer, a binder composition for a positive electrode, a slurry composition for a positive electrode, a positive electrode, a negative electrode and a secondary battery were produced in the same manner as those described in Example 1 except that the amount of molecular weight modifier was changed and reaction time and hydrogen pressure were changed, and were evaluated in the same manner as described in Example 1. The results are shown in Table 1.

Example 6

A copolymer, a binder composition for a positive electrode, a slurry composition for a positive electrode, a positive electrode, a negative electrode and a secondary battery were produced in the same manner as those described in Example 1 except that t-dodecyl mercaptan was used for 2,2',4,6,6'-pentamethylheptane-4-thiol as a molecular weight modifier during copolymer preparation, reaction time and hydrogen pressure were changed during hydrogenation reaction and a reaction was finished with the iodine value in Table 1 as an end point, and were evaluated in the same manner as described in Example 1. The results are shown in Table 1.

Example 7

A copolymer, a binder composition for a positive electrode, a slurry composition for a positive electrode, a positive electrode, a negative electrode and a secondary battery were produced in the same manner as those described in Example 1 except that the amount of acrylonitrile was changed to 40 parts, the amount of 1,3-butadiene was changed to 60 parts during copolymer preparation, reaction time and hydrogen pressure were changed during hydrogenation reaction and a reaction was finished with the iodine value in Table 1 as an end point, and were evaluated in the same manner as described in Example 1. The results are shown in Table 1.

Example 8

A copolymer, a binder composition for a positive electrode, a slurry composition for a positive electrode, a positive electrode, a negative electrode and a secondary battery were produced in the same manner as those described in Example 6 except that the amount of acrylonitrile was changed to 70 parts and the amount of 1,3-butadiene was changed to 30 parts during copolymer preparation and reaction time and hydrogen pressure were changed during hydrogenation reaction and a reaction was finished with the iodine value in Table 1 as an end point, and were evaluated in the same manner as described in Example 1. The results are shown in Table 1.

Example 9

A copolymer, a binder composition for a positive electrode, a slurry composition for a positive electrode, a positive electrode, a negative electrode and a secondary battery were produced in the same manner as those described in Example 1 except that the amount of acrylonitrile was changed to 40 parts, the amount of 1,3-butadiene was changed to 50 parts, and 5 parts of n-butyl acrylate and 5 parts of ethyl acrylate were used as the other monomers during copolymer preparation, reaction time and hydrogen pressure were changed during hydrogenation reaction and a reaction was finished with the iodine value in Table 1 as an end point, and were evaluated in the same manner as described in Example 1. The results are shown in Table 1.

Example 10

A copolymer, a binder composition for a positive electrode, a slurry composition for a positive electrode, a positive electrode, a negative electrode and a secondary battery were produced in the same manner as those described in Example 1 except that the amount of acrylonitrile was changed to 42 parts, the amount of 1,3-butadiene was changed to 50 parts, and 8 parts of n-butyl acrylate was used as the other monomers during copolymer preparation, reaction time and hydrogen pressure were changed during hydrogenation reaction and a reaction was finished with the iodine value in Table 1 as an end point, and were evaluated in the same manner as described in Example 1. The results are shown in Table 1.

Comparative Example 1

A binder composition for a positive electrode, a slurry composition for a positive electrode, a positive electrode, a negative electrode and a secondary battery were produced in the same manner as those described in Example 1 except that polyvinylidene fluoride (molecular amount: $6.3 \times 10^5$) was used for the copolymer that contains a nitrile group-containing monomer unit and a conjugated diene monomer unit, and were evaluated in the same manner as described in Example 1. The results are shown in Table 1.

Comparative Example 2

A copolymer, a binder composition for a positive electrode, a slurry composition for a positive electrode, a positive electrode, a negative electrode and a secondary battery were produced in the same manner as those described in Example 6 except that the amount of acrylonitrile was changed to 49 parts, the amount of 1,3-butadiene was changed to 51 parts during copolymer preparation, reaction time and hydrogen pressure were changed during hydrogenation reaction and a reaction was finished with the iodine value in Table 1 as an end point, and were evaluated in the same manner as described in Example 1. The results are shown in Table 1.

Note that the copolymer prepared in the aforementioned manner was dissolved during measurement of a degree of swelling in electrolysis solution, and thus a degree of swelling in electrolysis solution could not be measured (greater than 700%).

Comparative Example 3

A copolymer, a binder composition for a positive electrode, a slurry composition for a positive electrode, a positive electrode, a negative electrode and a secondary battery were produced in the same manner as those described in Example 6 except that the amount of acrylonitrile was changed to 15 parts, 80 parts of butylacrylate and 5 parts of glycidyl methacrylate were used for 1,3-butadiene during copolymer preparation and hydrogenation reaction was not performed, and were evaluated in the same manner as described in Example 1. The results are shown in Table 1.

TABLE 1

| | | | | | | Example 1 | Example 2 | Example 3 |
|---|---|---|---|---|---|---|---|---|
| Slurry composition | Binder composition | Copolymer Composition | Nitrile group-containing monomer unit | Acrylonitrile [mass %] | | 35 | 35 | 35 |
| | | | Conjugated diene monomer unit | 1,3-butadiene [mass %] | | 65 | 55 | 65 |
| | | | Other monomer unit | Butyl acrylate [mass %] | | — | 10 | — |
| | | | | Etyl acrylate [mass %] | | — | — | — |
| | | | | Glycidyl methacrylate [mass %] | | — | — | — |
| | | | Alkylthio group | Type*[1] | | A | A | A |
| | | | | Amount*[2] [mol] | | 0.5 | 0.2 | 0.5 |
| | | Iodine value [mg/100 mg] | | | | 6 | 11 | 10 |
| | | Degree of swelling in electrolysis solution [%] | | | | 250 | 300 | 220 |
| | | Mooney viscosity | | | | 66 | 72 | 40 |
| | | Storage elastic modulus*[3] [×10$^6$ Pa] | | | | 2.1 | 1.0 | 0.5 |
| | | Blending amount (in terms of solid content) [parts by mass] | | | | 2.0 | 2.0 | 2.0 |
| | Positive electrode active material | LiCoO$_2$ [parts by mass] | | | | 100 | 100 | 100 |
| | Conductive material | Acetylene black [parts by mass] | | | | 2.0 | 2.0 | 2.0 |
| Evaluation | | Electrode swelling ratio during storage at high temperatures [%] | | | | 106 | 103 | 109 |
| | | Electrode swelling ratio during cycles | | | | A | A | B |

TABLE 1-continued

| | | | | | Example 4 | Example 5 | Example 6 |
|---|---|---|---|---|---|---|---|
| Slurry composition | Binder composition | Copolymer Composition | Nitrile group-containing monomer unit | Acrylonitrile [mass %] | 35 | 35 | 35 |
| | | | Conjugated diene monomer unit | 1,3-butadiene [mass %] | 65 | 65 | 65 |
| | | | Other monomer unit | Butyl acrylate [mass %] | — | — | — |
| | | | | Etyl acrylate[mass %] | — | — | — |
| | | | | Glycidyl methacrylate [mass %] | — | — | — |
| | | | Alkylthio group | Type*[1] | A | A | B |
| | | | | Amount*[2] [mol] | 0.15 | 0.5 | 0.6 |
| | | Iodine value [mg/100 mg] | | | 12 | 15 | 10 |
| | | Degree of swelling in electrolysis solution [%] | | | 240 | 290 | 260 |
| | | Mooney viscosity | | | 80 | 66 | 52 |
| | | Storage elastic modulus*[3] [$\times 10^6$ Pa] | | | 12 | 2.1 | 0.8 |
| | | Blending amount (in terms of solid content) [parts by mass] | | | 2.0 | 2.0 | 2.0 |
| | Positive electrode active material | LiCoO$_2$ [parts by mass] | | | 100 | 100 | 100 |
| | Conductive material | Acetylene black [parts by mass] | | | 2.0 | 2.0 | 2.0 |
| Evaluation | Electrode swelling ratio during storage at high temperatures [%] | | | | 107 | 102 | 108 |
| | Electrode swelling ratio during cycles | | | | B | A | C |

| | | | | | Example 7 | Example 8 | Example 9 | Example 10 |
|---|---|---|---|---|---|---|---|---|
| Slurry composition | Binder composition | Copolymer Composition | Nitrile group-containing monomer unit | Acrylonitrile [mass %] | 40 | 70 | 40 | 42 |
| | | | Conjugated diene monomer unit | 1,3-butadiene [mass %] | 60 | 30 | 50 | 50 |
| | | | Other monomer unit | Butyl acrylate [mass %] | — | — | 5 | 8 |
| | | | | Etyl acrylate[mass %] | — | — | 5 | — |
| | | | | Glycidyl methacrylate [mass %] | — | — | — | — |
| | | | Alkylthio group | Type*[1] | B | B | A | A |
| | | | | Amount*[2] [mol] | 0.5 | 0.5 | 0.2 | 0.2 |
| | | Iodine value [mg/100 mg] | | | 14 | 13 | 12 | 11 |
| | | Degree of swelling in electrolysis solution [%] | | | 550 | 200 | 350 | 200 |
| | | Mooney viscosity | | | 50 | 90 | 60 | 60 |
| | | Storage elastic modulus*[3] [$\times 10^6$ Pa] | | | 0.8 | 100 | 0.8 | 1 |
| | | Blending amount (in terms of solid content) [parts by mass] | | | 2.0 | 2.0 | 2.0 | 2.0 |
| | Positive electrode active material | LiCoO$_2$ [parts by mass] | | | 100 | 100 | 100 | 100 |
| | Conductive material | Acetylene black [parts by mass] | | | 2.0 | 2.0 | 2.0 | 2.0 |
| Evaluation | Electrode swelling ratio during storage at high temperatures [%] | | | | 113 | 112 | 110 | 106 |
| | Electrode swelling ratio during cycles | | | | C | C | B | B |

| | | | | | Comparative Example 1 | Comparative Example 2 | Comparative Example 3 |
|---|---|---|---|---|---|---|---|
| Slurry composition | Binder composition | Copolymer Composition | Nitrile group-containing monomer unit | Acrylonitrile [mass %] | PVdA | 49 | 15 |
| | | | Conjugated diene monomer unit | 1,3-butadiene [mass %] | | 51 | — |
| | | | Other monomer unit | Butyl acrylate [mass %] | | | 80 |
| | | | | Etyl acrylate[mass %] | | — | — |
| | | | | Glycidyl methacrylate [mass %] | | — | 5 |
| | | | Alkylthio group | Type*[1] | | B | A |
| | | | | Amount*[2] [mol] | | 0.5 | 0.5 |
| | | Iodine value [mg/100 mg] | | | — | 10 | — |
| | | Degree of swelling in electrolysis solution [%] | | | 190 | dissolve | 600 |
| | | Mooney viscosity | | | — | 50 | — |
| | | Storage elastic modulus*[3] [$\times 10^6$ Pa] | | | 1600 | 0.8 | 0.5 |
| | | Blending amount (in terms of solid content) [parts by mass] | | | 2.0 | 2.0 | 2.0 |
| | Positive electrode active material | LiCoO$_2$ [parts by mass] | | | 100 | 100 | 100 |
| | Conductive material | Acetylene black [parts by mass] | | | 2.0 | 2.0 | 2.0 |

TABLE 1-continued

| Evaluation | Electrode swelling ratio during storage at high temperatures [%] | 115 | >120 | >120 |
|---|---|---|---|---|
| | Electrode swelling ratio during cycles | D | E | E |

*[1]A: 1,1-di (2,2-dimethylpropyl)-1-ethylthio group, B: t-dodecylthio group
*[2]Number of moles per 100 mol of monomer unit constituting a copolymer
*[3]Storage elastic modulus of binder coating obtained through film formation of binder composition It can be seen from Table 1 that, in the lithium ion secondary battery produced by using each binder composition of Examples from 1 to 10, expansion of a positive electrode can be suppressed even if the battery is stored at high temperatures or subjected to charging and discharging repeatedly.

INDUSTRIAL APPLICABILITY

According to this disclosure, a binder composition for a lithium ion secondary battery positive electrode and a slurry composition for a lithium ion secondary battery positive electrode that can suppress expansion of a positive electrode during storage at high temperatures or repetition of charging and discharging.

Further, according to this disclosure, a positive electrode for a lithium ion secondary battery with suppressed expansion during storage at high temperatures or repetition of charging and discharging can be provided.

Moreover, according to this disclosure, a lithium ion secondary battery that allows for suppression of performance degradation caused by expansion of a positive electrode can be provided.

The invention claimed is:

1. A binder composition for a lithium ion secondary battery positive electrode including a copolymer containing a nitrile group-containing monomer unit and a conjugated diene monomer unit and a solvent, wherein,
a degree of swelling in electrolysis solution of the copolymer is at least 200 mass % and no greater than 700 mass %,
a storage elastic modulus of a binder coating obtained through a film formation of the binder composition is at least $1 \times 10^4$ Pa and no greater than $1 \times 10^9$ Pa, and
the copolymer includes an alkylthio group of a carbon number from 12 to 16 having at least three tertiary or higher carbon atoms and a sulfur atom directly bonded to at least one of the tertiary or higher carbon atoms.

2. A binder composition for a lithium ion secondary battery positive electrode including a copolymer containing a nitrile group-containing monomer unit, a conjugated diene monomer unit and an alkylthio group and a solvent, wherein a degree of swelling in electrolysis solution of the copolymer is at least 200 mass % and no greater than 700 mass %, and
the alkylthio group is an alkylthio group of a carbon number from 12 to 16 having at least three tertiary or higher carbon atoms and a sulfur atom directly bonded to at least one of the tertiary or higher carbon atoms.

3. The binder composition for a lithium ion secondary battery positive electrode according to claim 2, wherein the copolymer includes at least 0.03 mol of the alkylthio group per 100 mol of a monomer unit constituting the copolymer.

4. The binder composition for a lithium ion secondary battery positive electrode according to claim 2, wherein the alkylthio group is at least one type selected from 1,1-di(2,2-dimethylpropyl)-1-ethylthio group and 1-(2,2-dimethylpropyl)-1-(2,2,4,4-tetramethylpentyl)-1-ethylthio group.

5. The binder composition for a lithium ion secondary battery positive electrode according to claim 2, wherein an iodine value of the copolymer is at least 0.01 mg/100 mg and no greater than 70 mg/100 mg.

6. The binder composition for a lithium ion secondary battery positive electrode according to claim 2, wherein the copolymer contains the nitrile group-containing monomer unit of at least 5 mass % and no greater than 70 mass % and the conjugated diene monomer unit of at least 30 mass % and no greater than 95 mass %.

7. The binder composition for a lithium ion secondary battery positive electrode according to claim 2, wherein a Mooney viscosity of the copolymer is at least 20 and no greater than 300.

8. A slurry composition for a lithium ion secondary battery positive electrode containing a positive electrode active material, a conductive agent and the binder composition for a lithium ion secondary battery positive electrode according to claim 2.

9. A positive electrode for a lithium ion secondary battery comprising a positive electrode mixed material layer formed by using the slurry composition for a lithium ion secondary battery positive electrode according to claim 8.

10. A lithium ion secondary battery comprising the positive electrode for a lithium ion secondary battery according to claim 9, a negative electrode, an electrolysis solution and a separator.

* * * * *